United States Patent [19]

Ogren

[11] 4,425,954
[45] Jan. 17, 1984

[54] METHOD AND APPARATUS FOR MOUNTING TIRES ON RIMS

[75] Inventor: Robert S. Ogren, Owatonna, Minn.

[73] Assignee: Motor Wheel Corporation, Lansing, Mich.

[21] Appl. No.: 255,786

[22] Filed: Apr. 20, 1981

[51] Int. Cl.³ .................................. B60C 25/08
[52] U.S. Cl. ........................................ 157/1.22
[58] Field of Search ............................ 157/1.22

[56] References Cited

U.S. PATENT DOCUMENTS

| | | | |
|---|---|---|---|
| 1,442,649 | 1/1923 | Cattoni | 157/1.22 |
| 2,900,017 | 8/1959 | Lewis | 157/1.22 |
| 3,823,756 | 7/1974 | Rainey | 157/1.22 X |
| 4,324,282 | 4/1982 | Leeper | 157/1.22 |

FOREIGN PATENT DOCUMENTS

294744  4/1932  Italy .................................. 157/1.22

*Primary Examiner*—James G. Smith
*Attorney, Agent, or Firm*—Barnes, Kisselle, Raisch, Choate, Whittemore & Hulbert

[57] ABSTRACT

The tire mounting tool for use in mounting a large, heavy off-highway pneumatic tire onto a dual-flanged single piece drop center wheel rim of the type having at each rim flange a re-entrant lip protruding radially inwardly toward the axis of the rim. The tool has a main frame adapted to be placed upon one side of the wheel rim when the rim is resting horizontally. The frame is longer than the inside diameter of the rim flange lip and slidably rests thereupon, and also slidably grips the rim lip and is bodily rotatable about the wheel axis. A pair of arms each are pivoted at their inboard ends to the main frame at a common pivot point for pivotal counter-rotational movement on opposite sides of the main frame about a pivot axis parallel to the rim axis. A pair of tire-bead-engaging shoes are carried one on each of the outboard ends of the arms. A pair of hydraulic rams are interconnected one between each of the arms and the main frame for counter-rotating the arms. The rams are operably interconnected for fluid pressure actuation in a parallel fluid circuit from a common hydraulic pressure fluid source.

13 Claims, 12 Drawing Figures

_Fig-6_

_Fig-7_

_Fig-8_

METHOD AND APPARATUS FOR MOUNTING TIRES ON RIMS

This invention relates in general to tire changing methods and equipment, and more particularly to a method and machine for installing giant tires on one-piece rims.

Tires and rims are manufactured in many different sizes for utilization with many different types of vehicles. The larger the size of the tire, the more difficult it becomes for a single individual to safely mount and dismount the tire to or from its associated rim.

Much of the heavy off-the-road transport equipment, such as the tractors and the trucks used at mines and quarries or the large machines used for earth excavations, utilize so-called giant tires which are large pneumatic tires of the tubeless variety. These tires may range up to 12'-0" in diameter and when mounted on their rims weigh over a ton each. The rims alone usually measure in excess of four feet in diameter.

Dual-flanged drop-center rims, such as commonly used for the pneumatic tires of passenger automobiles, have not until relatively recently been practical for the immense tires (sometimes called "off-the-highway" tires) utilized, for example, on large earth-moving equipment. To mount or remove a tire over the flange of a rim requires drawing the beads out of round, for the bead perimeter is necessarily shorten than the flange perimeter. With the relatively small pneumatic tires used for passenger cars, the force required to deflect a tire bead out of round and, holding it so, to manipulate it over the flange, may safely be applied locally by prying tools, such as tire irons. For much larger sizes of tires, this becomes impossible; the tire beads are reinforced with heavy wire, and hitherto it has been accepted that rubber and cord materials could not withstand proportionally larger forces if applied locally, as with prying tools.

At present, the general practice is to mount such large tires upon multi-piece rims. The multi-piece construction enables the rim to be disassembled so that it may be reassembled within a giant tire with relative ease. However, to attach and remove one or both of the removable rim flanges and other associated parts is a slow and painstaking procedure. An O-ring must be fitted between the rim base and the bead seat ring to prevent the pressurized air from escaping between the two, but it is not uncommon to have this seal installed improperly or to have it damaged during installation. As a consequence, a slow leak develops, resulting in costly downtime for an expensive piece of equipment.

Large one-piece rims have become available in recent years and have seen limited use for installation in giant tires which are manufactured with slight modifications to accomodate such rims. While these rims, which are known as one-piece drop-center rims, eliminate the leakage problems, they present problems of a different character, the most significant of which is the difficulty in mounting. Due to their extreme weight and large size, these tires are extremely difficult to manipulate over the one-piece rims. The problem is compounded by the fact that the side walls of such tires are quite thick and relatively rigid so they are not easily maneuvered over the flanges on the one-piece rims. Thus, for large earth mover tires, those which, for example, are mounted on 35 to 51 inch rim diameters and larger, heavy expensive equipment and a multitude of personnel have been required in order to complete a mounting operation.

With the large single-piece rims it is common, in fact it is necessary, when mounting large diameter tires on such rims, to employ large pieces of hydraulic equipment. However, for those off-highway tires in the range of sizes utilized for tractors, heavy trucks, construction vehicles, and mining vehicles, mounting at on-site or remote areas must often be accomplished without the benefit of fancy equipment. Use of such equipment and personnel is highly impractical in remote locations where one frequently finds the necessity for mounting and/or dismounting the tires. It is simply too impractical and costly to ship such tires and rims back to a central garage or tire handling facility where the large equipment might be available.

Although there have been developed over the years a multitude of hand tools and hydraulic tools for mounting both tube-type and tubeless-type pneumatic tires onto one-piece drop-center rims in the sizes customarily for highway passenger car use, such as the tire mounting tool shown in U.S. Pat. No. 2,900,017, such existing equipment and procedures have generally been found to be ill-adapted to the mounting of the aforementioned larger off-highway tires onto single-piece rims. Instead, the approach over the last ten or fifteen years has been to provide large and relatively expensive machinery for fixturing the rim and manipulating the off-highway tire in various ways to mount the same on the rim. Examples of this approach to the problem are found in U.S. Pat. Nos. 3,489,198; 3,612,140; 4,014,375; 4,031,941; 4,093,015 and 4,163,468, all of which show the "Malinski" approach, as well as other approaches shown in U.S. Pat. Nos. 3,942,575 and 4,109,698.

Hitherto there have been no simple and relatively inexpensive tools available which permit one person to more safely and easily mount such large off-highway tires onto single-piece rims. It may therefore be appreciated that a great need exists for a versatile tool which permits a single individual to on-site mount large diameter off-highway tires onto their associated single-piece rims.

Accordingly, an object of the present invention is to provide an improved method and apparatus which permits a single individual to mount largel. off-highway tires onto their associated rims which overcomes all of the disadvantages noted above with respect to the prior art.

More particularly, one of the principal objects of the present invention is to provide a machine which is capable of installing a giant tire on a one-piece drop-center rim in matter of minutes and with a minimum amount of manual labor. Another object is to provide a machine of the type stated which is simple in construction and durable. A further object is to provide a machine of the type stated which minimizes the chance of damaging the giant tires or the rims during installation.

Other objects of the present invention are to provide a new procedure and apparatus which makes it more feasible to use dual-flange drop-center rims for such large size pneumatic tires; which avoids imposing excessive prying forces on localized portions of the tire beads; which forces the tire out of round against distributed resistance, rather than by locally excessive prying forces; and which manipulates the beads gently over the rim flange. Further purposes are to provide apparatus by which one man can easily mount such massive tires, using dual-flanged drop-center rims.

A still additional object of the present invention is to provide a large tire mounting device which is portable and therefore may be easily transported to and utilized in remote areas.

A further object of the present invention is to provide apparatus for mounting large, off-highway tires which is extremely versatile in enabling a wide range of tire and rim sizes to be accommodated, and which is simple in construction and is therefore durable and amenable to inexpensive manufacture.

A still further object of the present invention is to provide a novel and uniqiue apparatus for permitting one person to mount large off-highway tires onto their associated rims in a manner which permits simple, quick and easy installation.

Another object of this invention is to provide a tool which may be constructed from conventional readily available components, which is durable and which therefore will have a long service life.

Other objects, features and advantages of the present invention will become apparent from the following detailed description taken in conjunction with the accompanying drawings, which are drawn to scale, and wherein:

Figure 1:
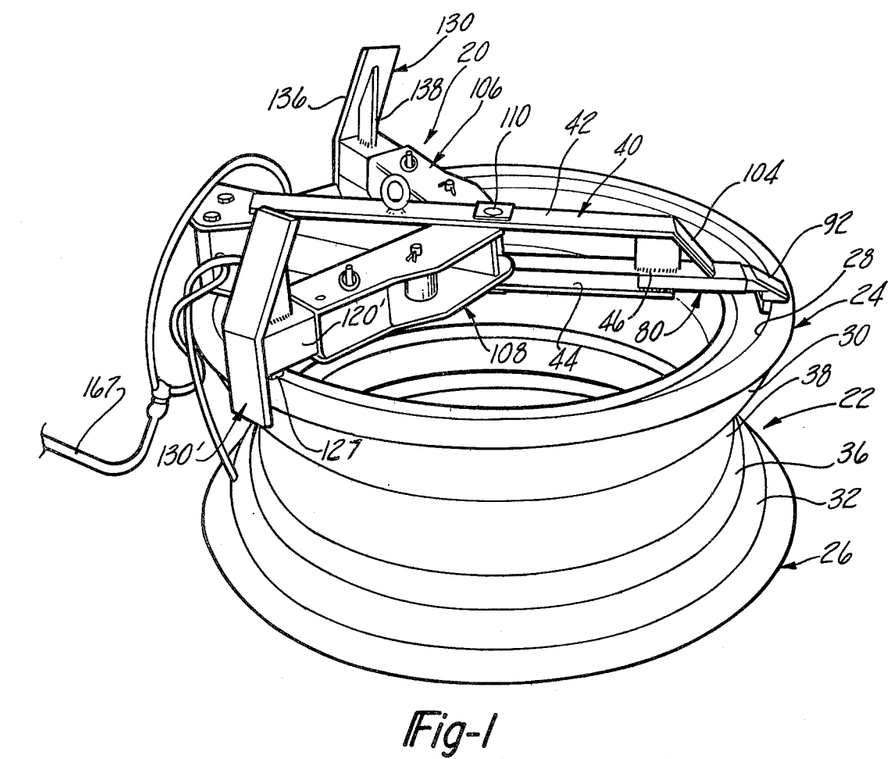
FIG. 1 is a perspective view of an exemplary but preferred embodiment of the tire mounting tool constructed in accordance with the present invention, and shown installed on a single-piece, dual-flanged off-highway rim, and with the tool shown in retracted start position.

Referring in more detail to FIG. 1, a tire mounting apparatus 20 of the present invention is shown mounted upon one side of a large size dual-flanged off-highway rim 22. The configuration of rim 22 is somewhat similar to that of the drop-center rims conventionally used for tires of passenger automobiles, but differs in several respects therefrom. The dual-flanges 24 and 26 of rim 22 have outer rounded edges with a re-entrant lip 28 (see also FIG. 5) which protrudes radially inwardly towards the axis of the rim. The dual bead seating portions 30 and 32 of the rim taper slopingly inwardly at an angle of approximately 15° relative to the rim axis and end in more steeply sloping sides 34 and 36 respectively, which in turn extend to both sides of the drop center portion 38 of the rim (see also FIG. 12).

Figure 3:
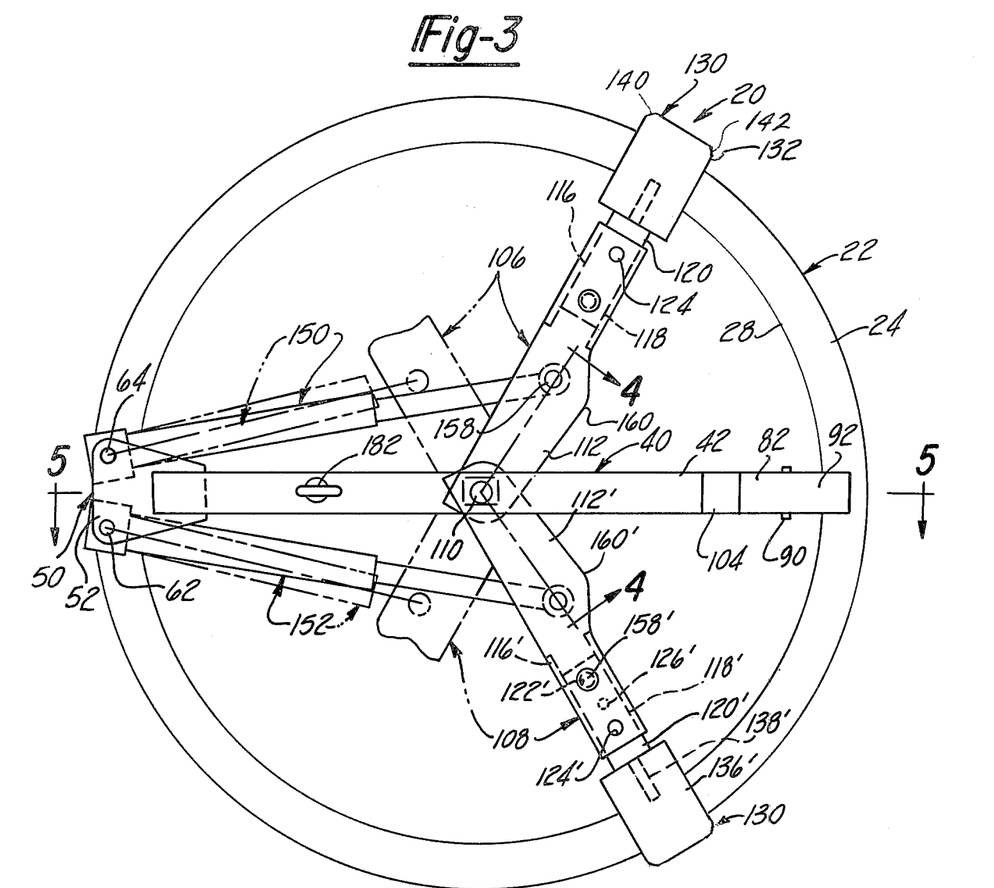
FIG. 3 is a top plan view of the tool and rim of FIGS. 1 and 2 with fthe dual arms shown at an intermediate position in their travel path.
Figure 5:
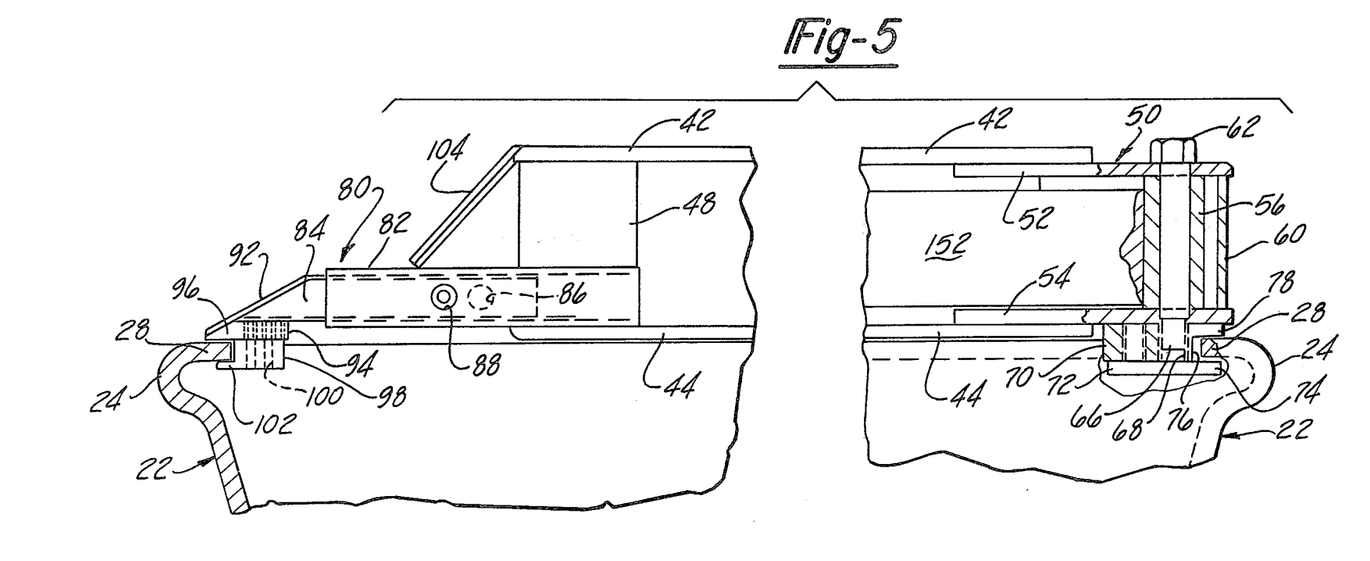

The tire mounting apparatus 20 of the present invention more particularly comprises a hydraulically actuated tire mounting tool constructed as a unitary portable assemblage adapted to rest slidably upon one side of rim 22 and to fixture itself thereupon in operation while the other axially opposite side of rim 22 is resting freely upon the ground, floor, or other suitable supporting surface in an unfixtured condition. Tool 20 includes a main frame 40 made up of top and bottom vertically spaced parallel plates 42 and 44 interconnected at one end by a pair of upright strut plates 46 and 48 and associated adapter weldment 80 (FIGS. 1, 3 and 5), and at the opposite longitudinal end by a cylinder block mounting sub-assembly 50. Cylinder block mount 50 comprises a pair of parallel, vertically spaced plates 52 and 54 which nest between and overlap plates 42 and 44 respectively and are welded thereto. Plates 52 and 54 are separated by a rectangular pair of cylinder pivot blocks 56 and 58 and are interconnected at their outer ends by a spacer plate 60. A pair of bolts 62 and 64 extend downwardly through registering apertures in plate 50 and pivot blocks 56 and 58 and into a stepped counter-bore in plate 54. Bolts 62, 64 each have a reduced diameter threaded end 66 protruding beyond plate 54 which threads into a threaded hole 68 of a notched block 70, whereby 62 and 64 clamp plates 53 and 54 against the pivot blocks 56 and 58. A hold-down plate 72 is welded to the underside of block 70 and has an outer edge portion 74 protruding past a notch 76 in block 70 such that a shoulder portion 78 of block 70 and edge 74 overlap the opposite side surfaces of rim flange lip 28 with a slight aliding clearance in the rim-mounted position of tool 20 as shown in FIGS. 3 and 5.

At the aforesaid one end of main frame 20, hereinafter termed the "nose" of tool 20, a longitudinally adjustable adapter weldment subassembly 80 is secured to and protrudes longitudinally beyond the nose end of main frame 40. Adapter 80 comprises a hollow rectangular sleeve 82 one end of which extends beneath plates 46 and 48 and is welded thereto as well as to plate 44. The opposite open end of sleeve 82 telescopically receives a smaller hollow rectangular sleeve 84 with a close sliding fit. Inner sleeve 84 has a series of axially opposed pairs of pin holes 86 provided in the side walls thereof and longitudinally spaced therealong adapted to be selectively registrable with a corresponding pair of pin holes 88 in the side walls of outer sleeve 82 for reception through the registered pin holes of an adjustment pin bolt 90 (FIG. 3). The outer end of inner sleeve 84 is bias cut to eceive on its inclined edges a guide plate 92 which extends downwardly and outwardly relative to the main frame into radially overlapping relationship with the rim flange lip 28 at a point diametrically of the rim 22 opposite the shoulder 78 of block 70. A slider block 94 having a slanted nose 96 is mounted by welding beneath the outer ends of sleeve 84 and plate 92 and radially overlaps rim flange lip 28. A holddown block 98 is mounted to the underside of block 94 by a socket head screw 100 and has a protruding lip 102 underlying and radially overlapping rim flange lip 28 such that lip 28 has a slight sliding clearance between lip 102 and nose 96 of block 94.

Another guide plate 104 extends between and is welded to the nose end of top plate 42 and the upper surface of sleeve 82 so as to provide an inclined ramp extending radially outwardly and downwardly of main frame plate 42.

Tool 20 also includes a pair of counter rotatable arms 106 and 108 which are pivotally mounted to main frame 40 at their inboard ends by a common pivot pin 110 which extends through coaxial holes in plates 42 and 44. Pin 110 is located midway between the ends of main frame 40 and is coaxial with the axis of rim 22 when tool 20 is operatively assembled and fixtured to rim 22. Reinforcement washers 111 and 113 are received on the protruding ends of pin 110 and are welded to plates 42 and 44 respectively. Pin 110 is axially retained by snap rings (not shown) which overlap washers 111 and 113.

Figure 2:
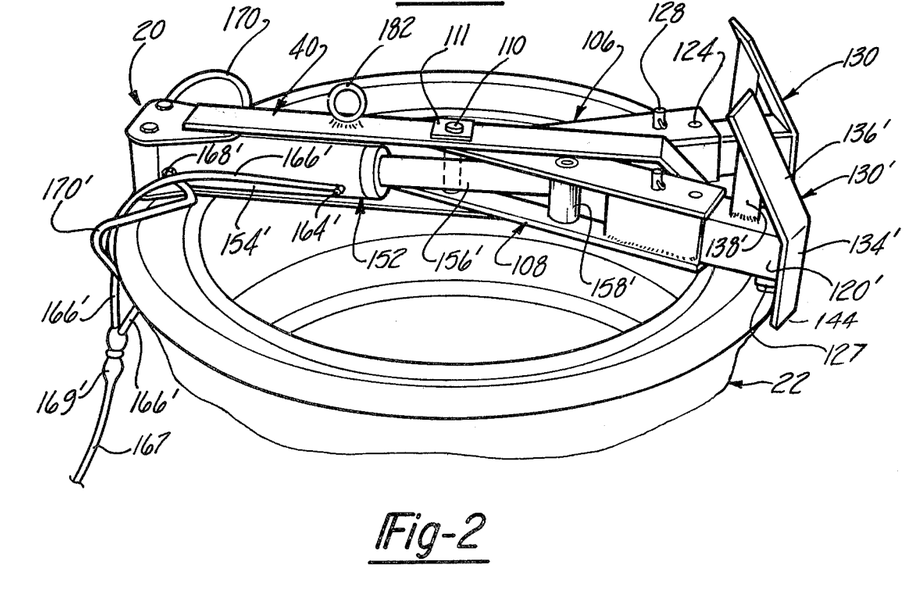
FIG. 2 is a view similar to that of FIG. 1 but showing the tool with its dual, counter-rotative arms moved to their opposite limits of travel relative to FIG. 1.
Figure 4:
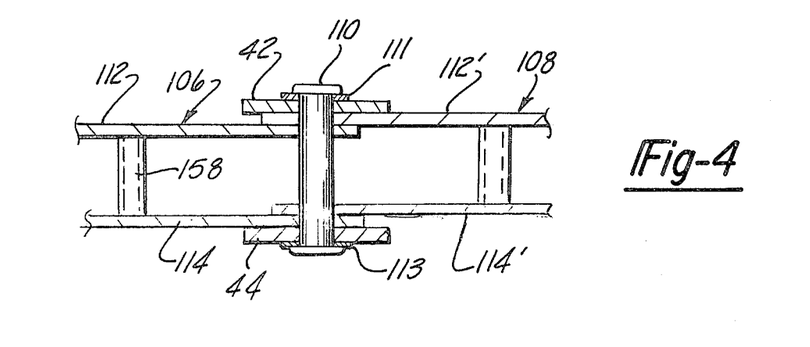
FIGS. 4 and 5 are fragmentary sectional views taken on the lines 4—4 and lines 5—5 respectively of FIG. 3, but enlarged somewhat thereover.

As best seen in FIG. 4, arm 106 comprises a pair of vertically spaced parallel plates 112 and 114 joined together by a pair of upright spacer plates 116 and 118 (FIG. 3) disposed at the outboard end of arm 106. The inner ends of arm plates 112 and 114 nest between frame plates 42 and 44 and are apertured to receive pivot pin 110 therethrough. The open outboard end of arm 106 telescopically receives with a close sliding fit a hollow rectangular carrier sleeve 120. Arm plates 112 and 114 are provided with axially aligned pairs of pin holes 122 and 124 spaced longitudinally of arm 106 near the outboard end thereof, and carrier sleeve 120 has a corresponding pair of axially aligned pin holes 126 in its top and bottom plates. Carrier holes 126 are adapted to be brought into selected registry with pin holes 122 or 124 for reception therethrough of an adjustment locking pin 128 (FIG. 2).

Arm 108 is constructed in like manner to arm 106 and thus has top and bottom plates 112',114',spacer plates 116',/ 118', carrier sleeve 120', etc. Arm plates 112' and 114' are vertically spaced from one another the same distance as arm plates 112,114 so as to nest between frame plates 42 and 44 and respectively rest upon arm plates 112,114 at their inboard ends (FIG. 5). The inboard ends of arm plates 112' and 114' are also apertured to receive pivot pin 110 therethrough to connect arm 108 at the common pivot point to the main frame 40. A spacer block 127 (FIGS. 1 and 2) is welded to the bottom of sleeve 120' to give support to arm 108 as the block 127 slides along the top of flange curl 28.

Each of the carriers 120, 120' has an associated tire bead engaging shoe 130,130' fixedly secured to its outer end. Shoes 130,130' are identical in construction and each comprise a V-shaped tire-bead-engaging wiper plate 132 having a flat, vertically extending portion 134 welded to the outer edges of carrier sleeve 120, and an upwardly sloping portion 136 extending radially inwardly of arm 106 and above sleeve 120. Portion 136 is supported by a strut 138 welded at its lower end to the top surface of sleeve 120 and along its inclined upper edge to the back surface of wiper plate portion 136, as best seen in FIGS. 1 and 2. The side edges 140 and 142 of wiper plate 132 (FIG. 3) are bevelled into a 45° chamfer to facilitate sliding engagement with the associated beads of the tire. Portion 134 of wiper 132 in one working example is approximately 8" long and is oriented so that its lower edge 144 (FIG. 2) axially overlaps and extends slightly axially inwardly from the rim flange 24 when tool 20 is operably mounted on rim 22. The inclined portion 136 of wiper 132 in one working example is about 10" long and is inclined to portion 134 at an angle of about 30 degrees. Carrier 120 and the associated shoe 130 are dimensioned and positioned with pin 128 such that there is a clearance of approximately 1/16" to $\frac{1}{8}$" between rim flange 24 and the juxtaposed surface of wiper portion 134 when tool 20 is centered in mounted position upon rim 22 as shown in FIG. 5.

Arms 106 and 108 are individually powered for counterrotative movement about the axis of pin 110 by associated hydraulic rams 150 and 152. Each ram 150,152 is commercially available double-acting ram of, for example, 25 ton capacity and includes a hydraulic cylinder 154 and associated piston 156. The rod end of piston 156 is pivotally connected to arm 106 by a pivot 158 mounted in aligned apertures of arm plates 112 and 114. Pin 158 is located outwardly from pin 110 about $\frac{1}{3}$ of the distance towards the working surface 134 of shoe 130. Arm plates 112,112' and 114,114' have a V-shaped contour 160,160' (FIG. 3) such that their widest point is in the vicinity of pivot pin 158 to provide added strength in the area maximum stress. The rearward end 162 of cylinder 154 is bolted to the front face of pivot block 56 so as to pivotally interconnect ram 150 via pivot pin 62 with the main frame 40. The other ram 152 is likewise pivotally connected to arm 108 at pivot pin 158' and to main frame 40 at pivot pin 64.

Each ram 150,152 has opposed internal working chambers in cylinder 154,154' separated by the head of associated piston 156, 156' (not shown), the retraction stroke working chamber of each ram 150,152 being connected by a hydraulic fitting 164,164' with a hydraulic pressure fluid supply line 166,166', and the forward stroke working chamber likewise being connected by a hydraulic fitting 168,168' with a hydraulic line 170,170' (FIG. 2). In accordance with one feature of the invention, the forward stroke working chambers of rams 150 and 152 are connected via the espective lines 170 and 170' in parallel circuit to a common source of hydfaulic pressure fluid comprising a conventional hydraulic pump and valve control unit (not shown). Likewise the retraction stroke working chambers of fams 150 and 152 are connected by the associated lines 166 and 166' in parallel circuit to a common source of hydraulic pressure fluid. The control valves associated with the hydraulic system for tool 20 are conventionally connected so that as pressure fluid is being fed to the forward stroke working chambers of rams 150 and 152, the retraction stroke working chambers are bled by their associated supply lines, and vice versa. In addition, the hydraulic system is equipped with a conventional pressure relief valve to limit the maximum of force suplied by rams 150 and 152 to arms 106 and 108. In one working example, pressure relief valves are operable to limit cylinder pressure to 8,500 psi. Hoses 166 and 166' are connected by a Y-coupling 169' to pressure hose 167 and a similar Y-fitting and single hose feeds to hoses 170 and 170'.

The method of mounting a tire, and the mode of operation of tool 20 for performing the method of the invention, will best be understood by referring to the sequence of tire mounting steps illustrated successively in FIGS. 6 through 12. The procedure starts with placement of rim 122 so that one side is laying flat on a flat horizontal supporting surface 180, the rim being unfixtured on this supporting surface. Then, tool 20 is lifted via ring 182, preferably by use of the hydraulic boom of a service truck or, if in a service shop, by use of an overhead chain fall hoist or the like. Locator pin 90 is removed and sleeve 84 retracted into sleeve 82 so that lip 102 can clear the rim flange lip 28. With adapter 80 retracted, the rear end of the tool is first brought down into engagement with the rim flange lip 28 so the same nests between lip 74 and shoulder 78 of the rear hold down 70, and then the nose end of the tool is lowered until block 96 rests on the outboard surface of rim flange lip 28. Then with tool 20 resting loosely on the upper side of rim 22, sleeve 84 is pulled out to register the pin holes 86 and 88, and locator pin 90 inserted in place to lock the adapter in the position shown in FIG. 5. Tool 20 is now restrained against axial movement relative to the rim 22 but is free to slide for bodily rotational movement about the coincident axes of rim 22 and pin 110. Preferably tool 20 is fixtured onto rim 22 with the arms 106 and 108 in their fully retracted position as shown in FIG. 1. In this position, the center of gravity of tool 20 is generally at the point of hoist ring 182 to assist in balance of the tool while the same is being fixtured.

Figure 6:
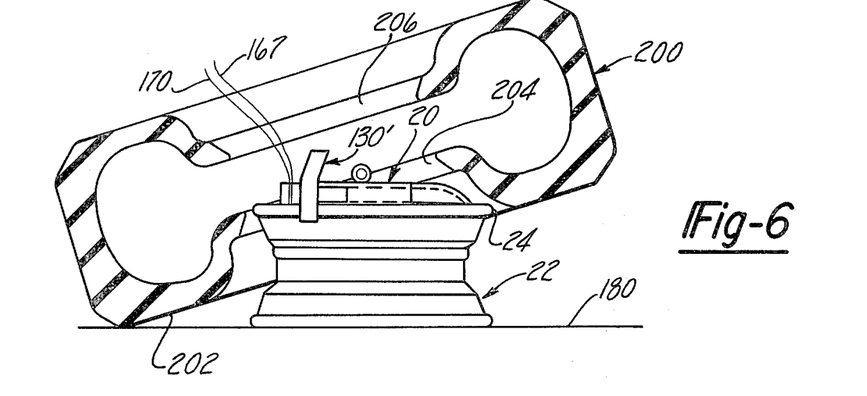
FIGS. 6 through 12 are side elevational views of the tool and rim of FIGS. 1 through 5 shown in operable association with a large off-highway tubeless tire and illustrating in sequence the successive steps and mode of operation of mounting the tire on the rim in accordance with the present invention.

When tool 20 has thus been fixtured on the unfixtured rim 22, the hoist is detached from tool 20 and then used to position a matching tire 200 into an initial inclined position superimposed over the rim 22 and tool 20 as shown at FIG. 6. In this position, the downwardly facing side wall 202 of tire 200 rests at one point on the floor 180 and the lowermost tire bead 204 rests at two generally diametrically opposite points on the rim flange 24. The retracted position of shoes 130,130' help in guiding tire 200 into this initial position. In one working embodiment of tool 20, arms 106 and 108 in their fully retracted position shown in FIGS. 1 and 6, define an included angle therebetween of 130°, each arm being equally spaced 65° from the longitudinal center line of main frame 40. The hydraulic hose lines 167-170 are lead up through the center of tire 200 and connected to the hydraulic pump and valve control connections (not shown), sufficient slack being provided in the hydraulic hoses so that the same can follow the bodily rotational movement of tool 20 described in more detail hereinafter.

To start the tire mounting sequence, the control valve is actuated to admit hydraulic fluid under pressure to the forward stroke working chambers of frams 150 and 152, fluid pressure being applied equally to each of the rams by way of the branch lines 170,170'. As the rams apply force to the arms through the pivot pins 158,158', the arms counter rotate about the axis of pin 110 and thereby propel the wiper shoes 130,130' along the circumference of rim flange 124, moving from left to right as viewed in FIGS. 6 through 9. In the fully extended position of rams 150,152 (FIG. 9), arms 106,108 have pivoted through about 95° and define an included angle therebetween of about 40°, each arm being equally inclined to main frame at an angle of about 20°.

Figure 7:
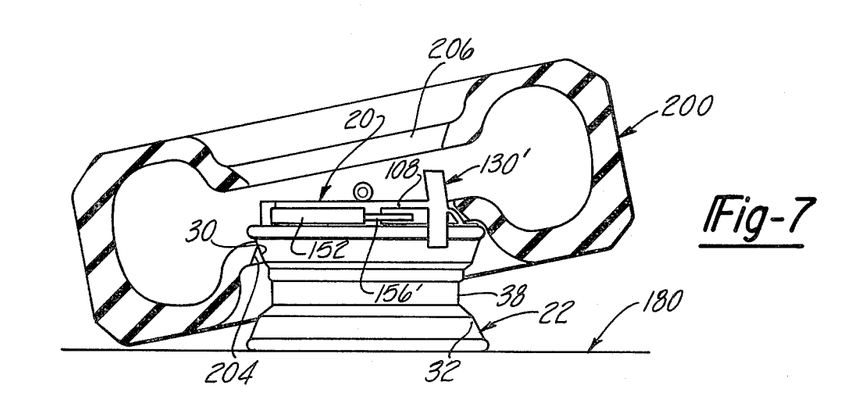
Figure 8:
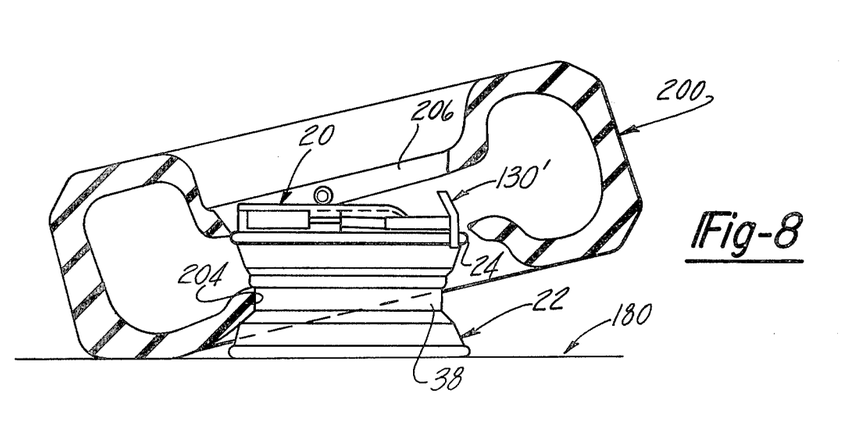
Figure 9:
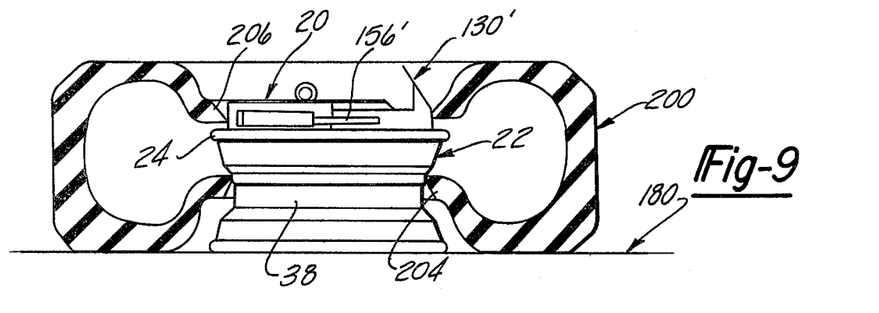

Referring in sequence to FIGS. 6, 7, 8 and 9 as shoes 130,130' begin their travel, they first spread apart in widening arcs while slidably engaging lower tire bead 204 so as to gradually expand the same. When shoes 130,130' have reached the position of FIG. 7, tire 200 will have been forced bodily to the right until bead 204 engages rim bead seat 30. As shoes 130,130' are moved from their FIG. 7 to their FIG. 8 position, bead 204 will be slidably progressively forced over rim flange 24. As tire bead 204 is thus stretched by the shoes, the portion of bead 204 engaging the rim upper bead seat 30 will be pulled so as to slide downwardly until bead 204 drops into the well 38 of the rim as shown in FIG. 8, thereby permitting the lower bead 204 to be necklaced or buttonhooked onto rim 22 by the further forward movement of shoes 130,130'. By the time shoes 130,130' reach the end limits of their forward travel, as shown in FIG. 9, the tire reaction forces will have pulled the final portion of bead 204, i.e., that portion stretched between shoes 130 and 130', over the adjacent portion of rim flange 24, whereupon tire 200 will snap downwardly and come to rest on the floor 180 with lower bead 204 loosely encircling the drop center 38 of the rim.

In accordance with one important feature of the present invention, it is to be noted that tool 20 is not significantly restrained from bodily rotational movement about the axis of the rim, i.e., the only such restraint is that imposed by sliding frictional forces generated at the diametrically opposite hold down engagement points of the tool with rim flange lip 28. Therefore, as each shoe 130,130' travels in its arcuate forward travel path outwardly and adjacent rim flange 24 in sliding engagement with tire bead 204, each shoe 130 and 130' can and does individually respond to variations in resistance along the surface of lower and upper tire beads 204 and 206 as well as along the surface of upper rim flange 24 and rim bead seat 30. Suitable lubricants for this purpose are those that will not readily dry and will not degrade the rubber but will dry within a reasonable amount of time.

Since both arms 106 and 108 are being propelled by hydraulically applied forces of equal magnitude due to the parallel connection of the working chambers of rams 150 and 152 to the hydraulic pump, whenever one of the shoes 130,130' encounters a reaction force of greater magnitude than that being encountered by the other shoe, then one shoe will be slowed or halted in its forward stroke travel relative to rim flange 24. As this occurs the other shoe will correspondingly accelerate its movement relative to rim flange 24 because main frame 40 thereupon pivots about the "stuck" shoe and thus bodily rotates about the rim axis due to the equal forces being continually applied from both rams. This bodily rotation of frame 40 will continue until such time as the tire reaction forces being exerted on the other shoe equalize with those being exerted on the halted or slowed shoe. Of course, as the reaction forces build up on both shoes, greater pressure is supplied from the hydraulic pump to overcome the reaction forces and propel the shoes through their forward working strokes. The aforementioned stop-and-go travel of each shoe, and the bodily rotation of main frame 40 to accommodate such force equalizing action, generally occurs in a somewhat random fashion and can result in main frame 40 pivoting through an angle of say 30° by the time it has completed the tire bead buttonhooking operation. However, the pivoting motion of main frame 40 about the rim axis also can be an oscillating-type action since such pivotal motion depends upon the variations in reaction forces individually encountered by each shoe during their travel. Thus, both the magnitude of the pivoting motion of frame 40 and the direction in which it pivots will be determined by the varying nature of the unbalanced reaction forces and the extent of frame pivoting required in each instance to bring the shoe reaction forces back into balance. As indicated previously, sufficient slack is provided in the hose lines 167-170 to allow the same to follow the aforementioned rebalancing bodily rotation motion of tool 20 relative to rim 22.

The aforementioned automatic pivoting re-balancing orientation capability of tool 20 has been found to greatly facilitate the tire mounting procedure by optimizing the application of forces and preventing damage to the tire bead. This feature also contributes to the efficiency of tool 20 with respect to driving power and structural strength requirements, thereby enabling giant off-highway tires to be mounted efficiently upon one-piece rims with a mounting tool 20 that, by comparison to the prior art, is relatively small, lightweight and portable, and which does not require that the rim itself be fixtured relative to its support 180.

It will also be appreciated that the foregoing frame pivoting re-balancing mode of operation of tool 20 is a function of the manner in which arms 106 and 108 are independently powered by their associated rams 150 and 152, the manner in which the rams are pivotally interconnected between one end of the main frame 40 and pivot points 158 and 158', as well as the pivotal connection of the inner ends of arms to a pivot point 110 disposed generally co-axially with rim 122. Accomplishment of the above improved results, of course, is also a function of the manner in which tool 20 is fixtured to rim 22 such that the same is restrained against all movement relative to the rim except for bodily rotational movement about the axis of pin 110.

It is also to be noted that the buttonhooking of tire bead 204 over rim flange 24, as described above, is further assisted by the ramps 104 and 92 at the nose end of tool 20 which slidably guide that portion of the tire beads stretched between shoes 130,130' as the same is forced toward the right during travel of the shoes as viewed in sequence from FIG. 7 to FIG. 9.

Another feature assisting in the aforementioned efficient tire mounting operation of tool 20 is the configuration of the bead wiper shoes 130,130'. The upwardly and inwardly inclined portion 136,136' of each shoe provides a pair of inclined ramps tending to keep initially orient tire 200 in the start position of FIG. 6. They also provide a gradual progressive sliding engagement with the tire bead and tend to shift the tire relative to the rim during initial stages of engagement so that a more balanced condition is obtained early-on in shoe travel. The shoe configuration also inhibits the tire from moving over the top of the shoes while mounting the first bead 204. The greatest forces encountered by shoes 130,130' occur in the final portion of shoe travel, from the FIG. 7 to the FIG. 9 positions. However, prior to such travel, tire bead 204 will have slid down inclined portion 136 and will be bearing against the vertical portion 132,132' of each shoe. Portion 132,132' is solidly backed up by its mounting on the square end of carrier 120,120'. It is also to be noted that, during such final travel, when the tire bead reaction forces are at their greatest magnitude, the same will be acting generally in the plane of arms 106 and 108, thereby minimizing the bending moments exerted on the shoes. Although it is possible that during tire mounting operation tool 20 can shift laterally a slight distance relative to the rim, in general the vertical portions 132,132' of both shoes 130 and 130' remain spaced outwardly a slight distance radially from rim flange 24 during their travel so as to minimize damage to the rim as well as to minimize the power requirements of tool 20.

Figure 10:
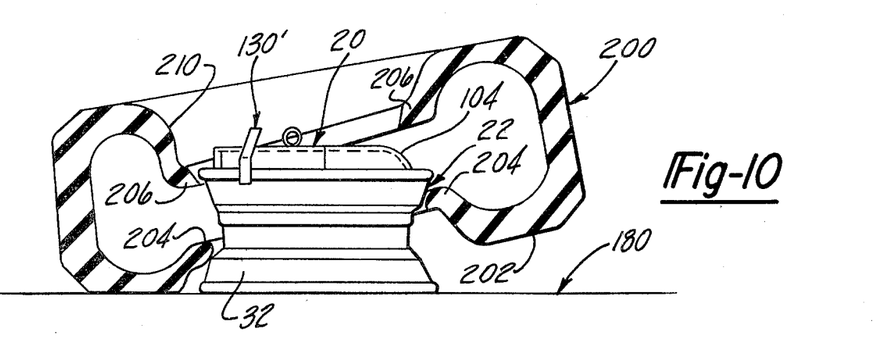

Once the lower tire bead 204 has been buttonhooked onto the rim, as shown in FIG. 9, the second phase of the tire mounting operation is initiated. The hydraulic controls are reversed and thereby apply pressure fluid equally to the retraction working chamber of each ram 150 and 152. The forward stroke reaction chambers are bled back to the source in the usual manner when setting the controls for start of the retraction strokes. The retraction stroke is, like the forward stroke, a power stroke. As shoes 130,130' are powered back to their start position, moving from the position of FIG. 9 to the position of FIG. 10, further manipulation of tire 200 relative to the rim takes place. Thus, at the start of the retraction stroke, upper bead 206 will already be in sliding engagement with shoes 130 and 130', due to the first phase positioning of tire 20 accomplished in the steps performed as described in conjunction with FIGS. 6 through 9. As shoes 130,130' move with counter rotation of the associated arms back toward their start position, they will force the rim to shift (toward the right as viewed in FIG. 10) relative to the tire so that, as illustrated in FIG. 10, upper bead 206 can drop downwardly over the upper rim flange 24 in the vicinity of the rear end of tool 20 (the left hand portion of bead 206 as viewed in FIG. 10). Likewise, when rim 22 is thus shifted, it will be forced away from lower bead 204 in this area. This relative shifting of tire 200 and rim 20 also will lift the diametrically opposite edge portions of the tire 200 (right hand side) such that upper bead 206 climbs onto ramp 104, as shown in FIG. 10, while the corresponding right hand portion of lower bead 204 is raised as this portion of the tire is lifted off the floor 180. It is to be understood that, although the reaction forces encountered by the shoes 130,130' with upper bead 206 during their retraction travel are generally of lower magnitude than that encountered during buttonhooking of lower bead 204, nevertheless tool 20 is capable of once again pivoting about the axis of pin 110 to re-orient itself and re-balance the reaction forces exerted on its shoes.

Once shoes 130,130' have been powered back to their start position, the controls are actuated to initiate another forward power stroke. As shoes 130,130' travel in this second forward stroke through the sequence illustrated in FIGS. 10, 11 and 12, they slidably engage and force the upper tire bead 206 over rim flange 24. As the upper bead 206 is stretched by the shoes, the upper side wall 210 of tire 200 will be distorted in the area thereof adjacent the rear end of tool 20 and upper tire bead 206 will slide down the 15° slope of rim seat 30 until it engages the reduced diameter drop center portion 38 to thereby accomplish necklacing of upper bead 206 relative to the rim. As shoes 130,130' travel between their position shown in FIGS. 11 and 12, the upper bead 206 will finally snap over rim flange 24, whereupon the reaction stresses developed in the tire 200 will cause the upper and lower beads to slide into engagement with their respective rim seats 30 and 32, while at the same time lifting rim 22 off of floor 180. It will be appreciated that the ability of tool 20 to mount tire 200 to an unfixtured rim enables tire 200 to lift the rim freely during this final mounting step. This is important to insure rapid and accurate final seating of the tire beads on the rim seats, and to also foreshorten the time period during which tire 200 is undergoing maximum distortion and stresses.

Figure 12:
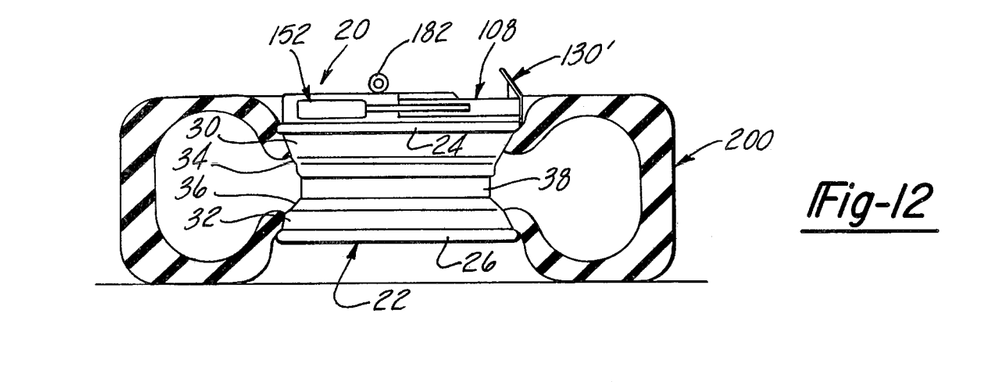

After the tire mounting operation has been completed as shown in FIG. 12, the aforementioned hoisting implement is reattached to ring 182. Then, adapter pin 90 is pulled free from the tool and sleeve 84 is pushed into retracted position so as to clear the hold down 102 from rim flange lip 28. Vertical force is then applied to tool 20 via the hoist, allowing the nose end of the tool to be lifted clear of the rim as tool 20 pivots about its hold down engagement at 74 with rim lip 28. Once the nose end of the tool is clear of the rim, tool 20 can be shifted longitudinally to the right as viewed in FIG. 12 to clear the rear end of tool 20 from the rim, and then tool 20 is free to be hoisted clear of the tire and rim.

In some instances, it may be preferable, prior to proceeding with the tool detachment steps described above, to power shoes 130 and 130' on their return stroke so as to bring the same from their position shown in FIG. 12 back to the start position shown in FIG. 6. Such retraction of the shoes will return the center of gravity of tool 20 into alignment with lift ring 182 and thus render the tool balanced for hoisting and thus more easily handled during detachment procedures. Alternatively, a second lift ring (not shown) may be attached to the upper surface of main frame 40 at a location co-incident with the center of gravity of tool 20 when shoes 130,130' are positioned as shown in FIG. 12, thereby obviating the need to retract the shoes prior to detachment of the tool from the rim.

Figure 11:
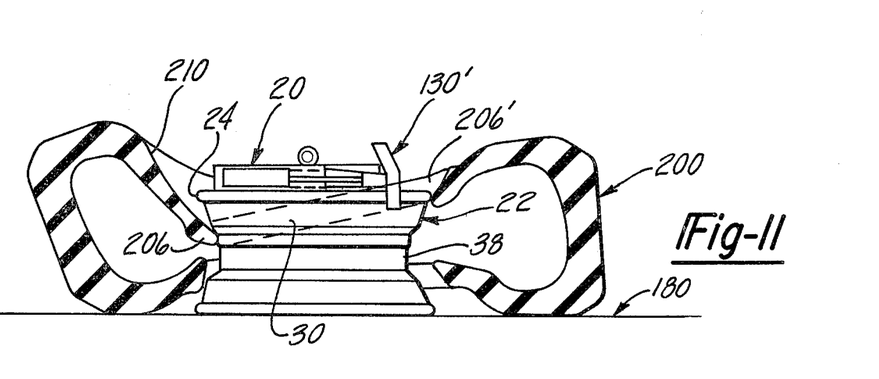

The foregoing method steps and tool operation procedures have been found to be sufficient to mount the above-described giant tire of bias-type construction without further manual or power tool assistance. However, with respect to giant tires of radial-type construction, it is preferred to employ one additional manipulative step in conjunction with the mounting of the upper bead 206 onto rim 22. This consists of applying downward force on tire side wall 210 in the vicinity of the rear of tool 20 (the portion of tire side wall 210 at the left hand side of FIG. 10) during the travel of shoes 130,130' in their retraction stroke as they travel from the position shown in FIG. 9 to the position shown in FIG. 10. Such downward pressing force can conveniently be supplied by using the hydraulically powered hoist boom customarily available on conventional field tire service trucks. This pressing force is effective to cause the upper bead 206 to be moved downwardly past rim flange 24 so that tire 200 will assume the position shown in FIG. 11, and thus be properly oriented for the forward stroke of shoes 130,130' to complete mounting of the tire on the rim. Once the upper bead has been so positioned as shown in FIG. 11, and forward travel of shoes 130,130' initiated, the downward assist force can be removed from upper side wall 210. Although tires of radial construction thus require one additional step to accomplish mounting of the same using the tool and method of the invention, such is not disadvantageous inasmuch as appropriate powered implements are already available in the field and service shops, and the same are required in any event in order to lift the giant tires and off-highway rims during servicing of the same.

By way of working example, tool 20 has been successfully operated to mount giant tubeless tires on single-piece 15° off-highway rims under the following specifications and conditions:

| Tire & Make | Size | Const. | Est. Weight - lbs. |
|---|---|---|---|
| Goodyear | 27.00 × 56.5 | Bias | 2800 |
| Goodyear | 30.00 × 56.5 | Bias | 3000 |
| Goodyear | 30.00 × 56.5 | Radial | 2800 |
| Goodyear | 33.00 × 59.5 | Bias | 3700 |
| Goodyear | 39.00 × 59.5 | Bias | 5700 |

| Rims: | Make | Size | Weight - lbs. |
|---|---|---|---|
| | Firestone | 20.00 × 56.5 | 1046 |
| | Goodyear | 20.00 × 56.5 | 1200 |
| | Firestone | 22.00 × 56.5 | 1239 |
| | Goodyear | 22.00 × 56.5 | 1250 |
| | Firestone | 23.5 × 59.5 | 1830 |
| | Firestone | 27.00 × 59.5 | 2032 |

Tool weight - 330# (Est.)
Machine operating time cycle (total 1st and 2nd bead = 5 min.)
No. of Personnel - 1 or 2 depending on situations
Max. Bead width 56.5 Dia. = 4.500"
Max. Bead width 59.5 Dia. = 7.375"

From the foregoing description, it will be apparent that the improved tire mounting method and device of the present invention fulfills the aforementioned objects in a relatively simple, efficient and economical manner. Moreover, it will now be evident that the invention provides a significant step forward in rendering one piece rims and tubeless tires practical for use in the so-called giant, off-highway tire field, where, despite the convenience and other advantages of this type of rim and tire, the same has hitherto found only limited acceptance because of the difficulty in mounting such tires and the corresponding complexity, size and cost of the associated tire mounting equipment of the prior art.

I claim:

1. In a tire mounting machine of the type which mounts a tire casing having two axially spaced beads onto a wheel rim having first and second axially spaced tire-bead-retaining circumferential flanges and at least one re-entrant surface means protruding radially inwardly of the rim and extending circumferentially therearound adjacent said first rim flange, annular bead seating areas axially inwardly adjacent to said flanges, and a sloping-walled drop center portion therebetween, the machine being of the type in which two counter-rotating bead deflector shoes are rotated adjacent one side of the rim and about such first flange, so as to commence travel adjacent to each other and then rotate through nearly semi-circular arcs of travel in an opposite sense with one of the two tire beads closest to the rim disposed at least partially in the drop center portion, the improvement for mounting the one tire bead over the rim first flange comprising:

(a) means for orienting said machine and rim with said bead deflector shoes in a retracted position generally adjacent to each other at a selected point along the circumference of the first rim flange in the vicinity of said portion of said one tire bead disposed in said rim drop center portion;

(b) means for counter-rotating said bead deflector shoes to slidably engage said one tire bead to stretch the same along the first rim flange in an arc widening progressively from said selected point during substantially the first one-third of their said arcs of travel and then to deflect said bead over the first rim flange during substantially the second two-thirds of their said arcs of travel to thereby complete the one bead deflection over the first flange of the rim, said shoe counter-rotating means comprising two counter-rotating arms with said bead deflector shoes individually supported thereon, and wherein said arms are mounted to counter-rotate about a common pivot point;

(c) holding means operably engaging said rim re-entrant surface for holding said tire mounting machine fixed against movement axially relative to said rim while permitting said machine to rotate bodily generally about the axis of the rim; and (d) means for powering said shoe counter-rotating means operable to apply substantially equal forces thereto during said shoe travel whereby said machine is pivotable relative to the rim in response to unequal reaction forces exerted by the tire beads on said shoes during their said arcs of travel, said powering means comprising a pair of rams individually propelling each shoe and hydraulic pressure fluid supply means operable to power said rams with equalized hydraulic pressure such that said rams are extensible independently of one another in accordance with the tire bead reaction forces exerted respectively thereagainst via the associated bead deflector shoe.

2. The machine as set forth in claim 1 wherein said machine holding means comprises means slidably fixturing said machine to said rim re-entrant surface means for said pivotal bodily movement along the adjacent side edge of said rim.

3. The machine set forth in claim 1 wherein said holding means is operable to maintain said common pivot point substantially co-axial with the axis of the rim pad wherein said arms include means for supporting said shoes for travel with a clearance between said shoes and rim.

4. The machine set forth in claims 1 or 2 wherein: said counter-rotating means is operable to cause said shoes to counter-rotate from their position at the completion of their said arcs of travel back to their starting position while slidably engaging said other tire bead to thereby at least partially distort said tire to thereby enable a portion of said other tire bead intermediate said shoes in the start position thereof to be dropped over the rim first flange and engage the rim, and wherein said counter-rotating means is further operable to cause counter-rotation of said shoes to cause the same to repeat their travel as set forth in clause (b) of claim 1 to thereby deflect the said other tire bead slidably over the first rim flange to thereby mount said other tire bead over the rim first flange subsequent to the mounting of the one tire bead over the rim first flange.

5. The machine as set forth in claim 4 wherein said rim is disposed with its axis upright, and support means having a horizontally disposed supporting surface upon which said second flange of said rim is supported loosely and freely whereby upon completion of said second counter-rotation said rim is elevated above said supporting surface by the resilient restoration force of the tire with the tire freely engaging said supporting surface.

6. A tire mounting device for use in mounting a large heavy off-highway pneumatic tire onto a dual-flanged single piece drop center wheel rim of the type having at each rim flange a re-entrant lip protruding radially inwardly toward the axis of the rim, said device comprising a main frame adapted to be placed upon one side of the wheel rim when the rim is resting horizontally on its axially opposite other side on the ground or like support, said frame being longer than the inside diameter of the rim flange lip and adapted to slidably rest thereupon but having an overall longitudinal dimension less than the maximum outside diameter of said rim, first and second hold down means disposed one at each of the opposite longitudinal ends of said main frame adapted to slidably underlie the lip of the one rim side, a pair of arms each secured at an inboard end thereof to said main frame at a common pivot point means for pivotal counter-rotational movement on opposite sides of said main frame about a pivot axis parallel to the rim axis, a pair of tire bead engaging shoes carried one on each of the outboard ends of said arms and ram powering means operably interconnecting said arms and main frame for pivotally counter-rotating said arms so as to propel said shoes in arcuate paths adjacent and outwardly of the rim flange of the one side of the rim, said powering means comprising a pair of rams individually propelling each shoe, said rams being driven from a common source of hydraulic pressure fluid whereby the rams are constantly powered by equalized hydraulic pressure and are extensible independently of one another in accordance with the tire bead reaction forces exerted respectively thereagainst via the associated bead deflector shoe.

7. A tire mounting device as set forth in claim 6 wherein said ram means comprises a pair of double-acting hydraulic piston and cylinder ram units each operably interconnected at one end to an associated one of said arms radially outwardly from said common pivot point and at the opposite end of said ram unit to one longitudinal end of said main frame.

8. The tire mounting device as set forth in claim 7 wherein said rams are adapted to be operably interconnected for fluid pressure actuation in a parallel fluid circuit from a common hydraulic pressure fluid source.

9. The tire mounting device as set forth in claims 6, 7 or 8 including telescopic mounting means for each of said shoes on the outboard end of the associated one of said arms, said mounting means including adjustment means for selectively positioning said shoes at preselected fixed distances measured radially from said common pivot point such that said shoes may be spaced in operation with a slight clearance from the associated rim flange of the wheel rim.

10. The tire mounting device as set forth in claims 6, 7 or 8 wherein said common pivot point is disposed centrally longitudinally of said main frame such that in operation of said device said arms are pivotal about an axis generally co-incident with the axis of the wheel rim.

11. The tire mounting device as set forth in claim 8 wherein said main frame comprises a framework having parallel top and bottom plate means with said bottom plate means being adapted to rest slidably upon the rim flange and spanning a distance slightly greater than the inside diameter of said wheel rim flange lip, said plate means being interconnected at one longitudinal end by a cylinder block mounting means, the cylinder of each of said rams being pivotally connected to said cylinder block mounting means, said top plate means of said frame having another end thereof remote from said one end spaced radially inwardly from the associated other end of said bottom plate means, and ramp means connected beween said top and bottom plate means at said remote other ends thereof and being inclined downwardly and radially outwardly from said top plate.

12. The tire mounting device set forth in claim 11 wherein said arms each comprise parallel top and bottom plates extending at their radially inwardly disposed ends between said top and bottom plate means of said main frame so as to overlap one another at said common pivot point means, said common pivot point means comprising a bolt extending through aligned apertures in said top and bottom plate means of said arms and main frame.

13. The tire mounting device of claims 6, 7 or 8 wherein said shoe comprises a first portion extending generally parallel to the rotational axis of said arms so as to be disposed radially outwardly of and to overlap the rim flange axially of the rim in operation of said device on the rim, and a second portion extending upwardly from said first portion at an acute angle to said rotational axis so as to overlie the radially outer end of the associated arm.

* * * * *

UNITED STATES PATENT AND TRADEMARK OFFICE
CERTIFICATE OF CORRECTION

PATENT NO. : 4,425,954
DATED : January 17, 1984
INVENTOR(S) : Robert S. Ogren

It is certified that error appears in the above-identified patent and that said Letters Patent are hereby corrected as shown below:

Column 2, line 45, "largel." should be -- large,--
Column 3, line 35, "fthe" should be -- the --
Column 6, line 22 "hydfaulic" should be -- hydraulic --
Column 6, line 25, "fams" should be -- rams --
Column 7, line 28, "frams" should be -- rams --

Column 8, line 6, insert the following language

-- forces reactively applied to the shoes by the tire. Such variations occur randomly and arise from such factors as out-of-roundness of the tire and/or rim, frictional coefficient variations in the lubricant coating tire bead 204 and possible non-centered initial orientation of the tire relative to the starting position of the shoes in establishing the setup of FIG. 6. Such reactive force variations occur despite the fact that, prior to and in preparation for positioning of tire 200 on the tool and rim as shown in FIG. 6, commercial bead lubricants are preferably employed, the same being brushed --

Signed and Sealed this

Eighth Day of May 1984

[SEAL]

Attest:

GERALD J. MOSSINGHOFF

Attesting Officer

Commissioner of Patents and Trademarks